United States Patent
Shi et al.

(10) Patent No.: US 8,618,784 B2
(45) Date of Patent: Dec. 31, 2013

(54) REGULATOR CONTROL CIRCUITS, SWITCHING REGULATORS, SYSTEMS, AND METHODS FOR OPERATING SWITCHING REGULATORS

(75) Inventors: Justin Shi, Austin, TX (US); Alan Roth, Leander, TX (US); Eric Soenen, Austin, TX (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 659 days.

(21) Appl. No.: 12/750,149

(22) Filed: Mar. 30, 2010

(65) Prior Publication Data
US 2010/0259239 A1 Oct. 14, 2010

Related U.S. Application Data

(60) Provisional application No. 61/168,377, filed on Apr. 10, 2009.

(51) Int. Cl.
*G05F 1/00* (2006.01)

(52) U.S. Cl.
USPC .................. 323/288; 323/271; 323/315

(58) Field of Classification Search
USPC .............. 323/265, 271, 282, 283, 284, 288
See application file for complete search history.

(56) References Cited

U.S. PATENT DOCUMENTS

| | | | |
|---|---|---|---|
| 5,384,740 A * | 1/1995 | Etoh et al. | 365/189.09 |
| 5,477,175 A * | 12/1995 | Tisinger et al. | 327/143 |
| 6,157,180 A * | 12/2000 | Kuo | 323/282 |
| 6,535,446 B2 * | 3/2003 | Moscaluk | 365/226 |
| 6,747,440 B2 * | 6/2004 | Weder | 323/276 |
| 7,230,408 B1 * | 6/2007 | Vinn et al. | 323/273 |
| 7,429,852 B2 * | 9/2008 | Takagi et al. | 323/280 |
| 7,449,944 B2 * | 11/2008 | Byeon et al. | 327/589 |
| 7,893,681 B2 * | 2/2011 | Arai | 323/313 |
| 7,906,948 B2 * | 3/2011 | Qiu et al. | 323/282 |
| 7,906,953 B2 * | 3/2011 | Dikken et al. | 323/288 |
| 2004/0036456 A1 * | 2/2004 | Foss et al. | 323/274 |
| 2006/0255774 A1 * | 11/2006 | Motomori et al. | 323/224 |

FOREIGN PATENT DOCUMENTS

| | | |
|---|---|---|
| CN | 1479909 A | 3/2004 |
| CN | 1211758 C | 7/2005 |
| CN | 1764049 A | 4/2006 |
| CN | 100472922 C | 3/2009 |

OTHER PUBLICATIONS

Maxim 2A, 76V, High-Efficiency MAXPower Step-Down DC-DC Converters, MAX5090A/B/C, 19-3872; Rev 0/ 3/06, pp. 1-17, www.maxim-ic.com.

MPS the Future of Analog IC Technology, MP4460 2.5A, 4MHz, 36V Step-Down Converter, MP4460 Rev. 1.01, Jun. 8, 2011, pp. 1-17, www.monolithicpower.com.

(Continued)

*Primary Examiner* — Adolf Berhane
*Assistant Examiner* — Lakaisha Jackson
(74) *Attorney, Agent, or Firm* — Lowe Hauptman & Ham, LLP

(57) ABSTRACT

A regulator control circuit includes a high side driver that is configured to receive a supply voltage. A capacitor is configured to store charges. A first transistor is coupled between the capacitor at a first node and a gate of a high side driver at a second node. The first node is capable of being boosted to a voltage to operate the first transistor at a saturation mode for a charge sharing between the first node and the second node so as to substantially turn on the high side driver.

18 Claims, 4 Drawing Sheets

(56) References Cited

OTHER PUBLICATIONS

Analog Tech, Product Data Sheet, AAT1184, High-Voltage Step-Down Regulator, 1184.2008.07.1.0, pp. 1-19, www.analogitech.com.

Analog Tech, Product Data Sheet, AAT1189, High-Voltage Step-Down Regulator, 1189.2008.06.1.0, pp. 1-19, www.analogitech.com.

Richtek, RT8250, 3A, 23V, 340kHz Synchronous Step-Down Converter, DS8250-05 Mar. 2011, pp. 1-12, www.richteck.com.

Richtek, RT8251, 5A, 24V, 570kHz Step-Down Converter, DS8251-00 Jul. 2010, pp. 1-16, www.richteck.com.

Office Action dated Feb. 24, 2012 from corresponding application No. CN 201010162889.5.

Chinese Application No. 2012022100780710 which corresponds to U.S. Appl. No. 12/750,149.

* cited by examiner

REGULATOR CONTROL CIRCUITS, SWITCHING REGULATORS, SYSTEMS, AND METHODS FOR OPERATING SWITCHING REGULATORS

CROSS-REFERENCES TO RELATED APPLICATIONS

The present application is related to U.S. Application Ser. No. 61/168,377, entitled "REGULATOR CONTROL CIRCUITS, SWITCHING REGULATORS, SYSTEMS, AND METHODS FOR OPERATING SWITCHING REGULATORS" filed on Apr. 10, 2009, which is incorporated herein by reference.

TECHNICAL FIELD

The present disclosure relates generally to the field of semiconductor circuits, and more particularly, to regulator control circuits, switching regulators, systems, and methods for operating switching regulators.

BACKGROUND

In recent years, there continues to be dramatic density increases in integrated circuit technology for semiconductor chips. For example, the minimum feature size of lithography, such as the size of MOSFETs, has been reduced to one micrometer and below. In the fabrication of precision capacitors in conjunction with FET devices on the same chip at these reduced dimensions, it is increasingly difficult to maintain manufacturing parameters such that precise outputs from these devices are still available.

The integrated circuits have been applied in various electronic devices, such as cellular phones, PDAs, computers, and/or other electronic devices. Conventionally, an external power received by the electronic devices is different than that for operating the integrated circuits of the electronic devices. For example, a laptop computer conventionally receives a 20-V power from batteries and integrated circuits of the computer functions under 3 V or 5 V. To convert the supplied power to the internal operating voltage, DC-to-DC converters have been widely applied.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION

Figure 1:
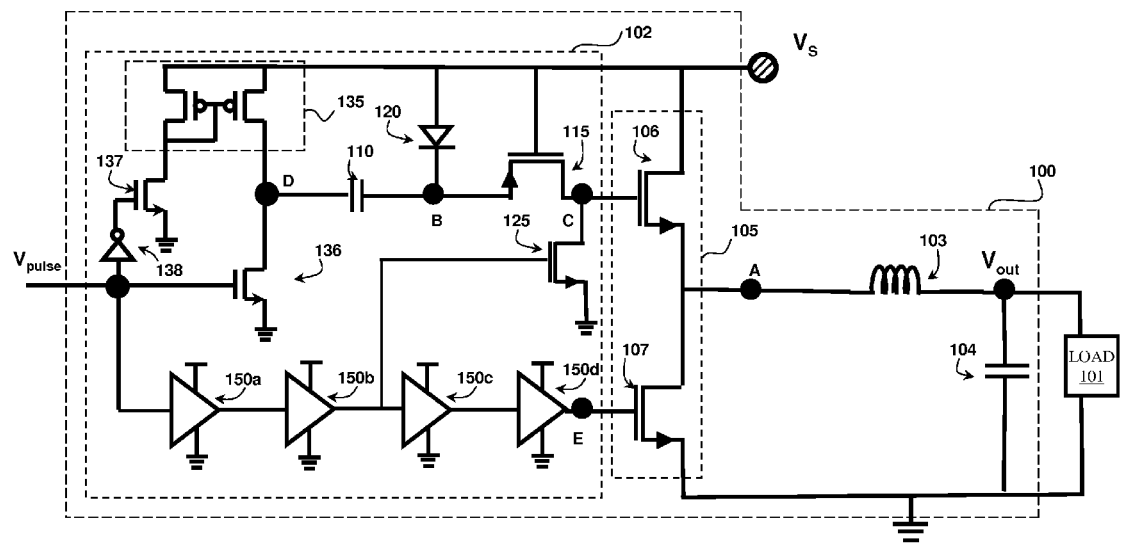
FIG. 1 is a schematic drawing illustrating an exemplary switching regulator.

A switching regulator can serve as a DC-to-DC converter. A conventional switching regulator consists of a driver stage coupled with a power voltage. The conventional switching regulator can output a regulated voltage. Conventionally, the driver stage consists of a high side driver, i.e., a PMOS transistor, and a low side driver, i.e., an NMOS transistor. The PMOS transistor and the NMOS transistor are alternatively turned on to couple the supply voltage to and release the coupled supply voltage at an output of the driver stage, respectively. It is found that the PMOS transistor has a turned-on resistance higher than that of its NMOS counter part. The high-resistance PMOS transistor may undesirably affect the operation of the switching regulator.

To solve the issue involving the high-resistance PMOS transistor, an NMOS transistor has been used to replace the PMOS transistor as the high side driver. In order to turn on the NMOS transistor, a conventional switching regulator uses an off-chip capacitor to boost the voltage at the gate of the NMOS transistor. It is found that the off-chip capacitor makes the design of the switching regulator complicate. The addition of the off-chip capacitor also incurs more overheads.

Another way to boost the voltage at the gate of the NMOS transistor has been proposed by adding a charge pump circuit within a switching regulator. However, during pumping the charge pump circuit may lose energy. The energy loss of the charge pump circuit may result in an undesired efficiency for boosting the voltage at the gate of the NMOS transistor. It is also found that the area of the switching regulator including the charge pump circuit increases and the design of the switching regulator becomes complicate.

Another conventional switching regulator uses an NMOS transistor as the high side driver and a diode as a low side driver. The switching regulator uses a control circuit to provide a signal to close a switch to couple a boosted voltage to a gate of the NMOS transistor. It is found that the boosted voltage is susceptible to a variation in the supply voltage. The voltage may be over boosted, damaging the gate oxide layer of the NMOS transistor. The voltage may be under boosted, not desirably turning on the NMOS transistor. The switching also allows charge sharing to occur immediately after closing of the switch. This may result in energy loss in boosting the gate voltage.

Based on the foregoing, regulator control circuits, switching regulator, systems, and method for operating the regulator control circuits are desired.

It is understood that the following disclosure provides many different embodiments, or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a schematic drawing illustrating an exemplary switching regulator. In embodiments using a DC-DC converter, a switching regulator 100 can be configured to receive a supply voltage $V_s$, e.g., about 24V, outputting a regulated voltage $V_{out}$, e.g., about 5 V. The regulated voltage can be applied to various integrated circuits and/or printed circuit boards (PCBs) for operations. In FIG. 1, the reference numeral 101 can represent a load of at least one integrated circuit coupled within the switching regulator 100. It is noted that the values of the supply voltage $V_s$ and the regulated voltage $V_{out}$ described above are merely exemplary. One of skill in the art can modify the values to achieve desired supply voltage $V_s$ and regulated voltage $V_{out}$.

Referring to FIG. 1, the switching regulator 100 can include a regulator control circuit 102, an inductor 103, a capacitor 104, and a driver stage 105. The driver stage 105 can comprise a high side driver 106 and a low side driver 107. Each of the high side driver 106 and the low side driver 107 can have a gate. A drain end of the high side driver 106 can be coupled with the supply voltage $V_s$. A source end of the low side driver 107 can be coupled with the ground. A source end of the high side driver 106 and a drain end of the low side driver 107 can be coupled with the output node A of the regulator control circuit 102.

The regulator control circuit 102 can alternatively couple the supply voltage $V_s$ and ground to an output end A of the regulator control circuit 102. By switching the coupling of the output end A to the supply voltage $V_s$ or ground, a current can be provided from the supply voltage $V_s$ to the inductor 103 or a current can be released from the capacitor 104 to the ground. By controlling a current change of the inductor 103, the regulated voltage $V_{out}$ can be provided to the circuits having the load 101.

In some embodiments, the regulator control circuit 102 can be disposed within a single integrated circuit. The inductor 103 and the capacitor 104 can be disposed over a printed circuit board (PCB). In at least one embodiment, the regulator control circuit 102, the inductor 103, and the capacitor 104 can be formed within the same chip. In yet another embodiment, the inductor 103 and the capacitor 104 can be disposed within an integrated circuit.

Referring to FIG. 1, the regulator control circuit 102 can include a capacitor 110. The capacitor 110 can be configured to store charges provided from the supply voltage $V_s$. The regulator control circuit 102 can include a transistor 115 coupled between the gate of the high side driver 106 and the capacitor 110. A node B can be disposed between the capacitor 110 and the transistor 115. A node C can be disposed between the transistor 115 and the gate of the high side driver 106. In some embodiments, the transistor 115 can be a PMOS transistor, a high-voltage PMOS (HV PMOS) transistor, or other transistor that is capable of operating under a high voltage supply. In some embodiments, the capacitor 110 and the transistor 115 can be integrated in a single chip or on a single substrate. The capacitor 110 can be disposed within the regulator control circuit 102.

The regulator control circuit 102 can include a diode 120. The diode 120 can be, for example, a zener diode and configured to clamp the voltage at the node B around a predetermined value or less. In some embodiments using a 24-V supply voltage $V_s$, the voltage at the node B can be clamped between about 24 V and about 30 V.

In some embodiments, the regulator control circuit 102 can include a transistor 125 coupled between the node C and ground. In some embodiments, the transistor 125 can be an NMOS transistor, a double diffused MOS (DMOS) transistor, or other transistor. The transistor 125 is functionable to couple the node C with ground, turning off the high side driver 106. As noted, a voltage difference between the gate and the drain of the transistor 125 can be about 24 V. In some embodiments using a DMOS transistor, the transistor 125 can desirably reduce damage to the gate oxide layer of the transistor 125 resulting from the high voltage difference.

The regulator control circuit 102 can include a current mirror 135, transistors 136, 137, and a logic gate, e.g., an inverter 138. The current mirror 135 can be coupled with the supply voltage $V_s$. The transistor 136 can be coupled between the node D and ground. The transistor 137 can be coupled between the current mirror 135 and ground. The inverter 138 can be coupled between an input end capable of receiving a pulse $V_{pulse}$ and the transistor 137. The pulse $V_{pulse}$ can include a switching cycle for controlling turning on or off of the high side driver 106. The regulator control circuit 102 can also include at least one buffer, e.g., buffers 150a-150d. The buffer 150d can be coupled with the gate of the low side driver 107. The buffer 150a can be configured to receive the pulse $V_{pulse}$ to turn on or off the low side driver 107.

Following is a description regarding charging the capacitor 110. In some embodiments using a 24-V supply voltage $V_s$, the buffer 150a can receive the pulse $V_{pulse}$ for turning on the low side driver 107 and the transistor 125. For example, a node E disposed between the buffer 150d and the low side driver 107 can be about 5 V (shown in FIG. 2) for turning on the low side driver 107 and the transistor 125. The turned-on transistor 125 can couple the node C with ground (shown in FIG. 2). The turned-on low side driver 107 can couple the output end A with the ground (shown in FIG. 2), releasing a current that flows from ground to the capacitor 104 through the inductor 103.

Figure 2:
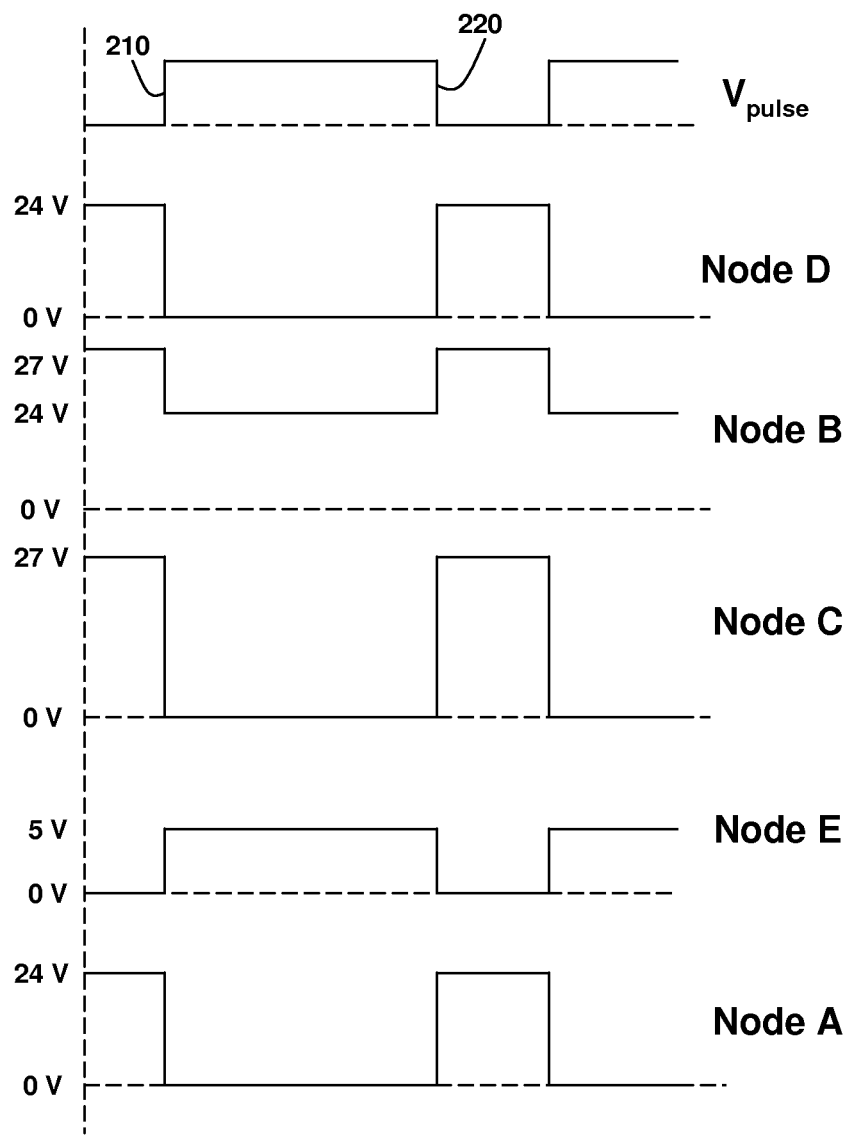
FIG. 2 is schematic drawing illustrating wave forms of various nodes of an exemplary switching regulator.

Referring to FIGS. 1-2, the pulse $V_{pulse}$ can be applied to the inverter 138 and a gate of the transistor 136. The pulse $V_{pulse}$ can have a switching cycle transitioning from a state, e.g., low, to another state, e.g., high as a transition 210 shown in FIG. 2. Since the transition 210 goes high, the transistor 136 is turned on, coupling a node D disposed between the current mirror 135 and the capacitor 110 to ground. The inverter 138 can invert the high state of the transition 210 to low, turning off the transistor 137. Since the transistor 137 is turned off, the current mirror 135 is off. A current can flow from the supply voltage $V_s$ through the diode 120 to the capacitor 110, charging the capacitor 110. As noted, the supply voltage $V_s$ can be about 24 V. The voltage of the node B can be pulled up and/or kept at about 24 V minus a voltage drop of the diode 120 (shown in FIG. 2). A voltage drop $V_{BD}$ between the node B and the node D can be about 24 V minus a voltage drop on the diode 120. In some embodiments using a PMOS transistor as the transistor 115, the voltage difference between the gate and the source of the transistor 115 is small and the transistor 115 is turned off. Since the transistor 115 is turned off, the charge and/or voltage at the node B are free from being coupled to the node C. As noted, the node C is coupled with ground. Without the charge sharing between the nodes B and C, the voltage at the node C is free from turning on the high side driver 106. Since the turned-on low side driver 107 can couple the output end A with the ground (shown in FIG. 2), releasing a current that flows from ground to the capacitor 104 through the inductor 103.

Following is a description regarding boosting the voltage at the node B. During the boosting period, the low side driver 107 and the transistor 125 are turned off. The voltage of the node E can be pulled down from 5 V to 0 V (shown in FIG. 2). The turned-off low side driver 107 can shut off the path between the node C and ground. The turned-off transistor 125 can shut off the path between the output end A and ground.

If the switching cycle transitions from high to low, e.g., a transition 220 (shown in FIG. 2), the transistor 136 can be turned off and the transistor 137 can be turned on. The turned-on transistor 137 can provide a current flowing from the supply voltage $V_s$ to the ground. The current flowing through the transistor 137 can be mirrored such that the right PMOS transistor of the current mirror 135 is turned on, coupling the 24-V supply voltage $V_s$ to the node D. As noted, an existing voltage drop $V_{BD}$, e.g., about 24 V, is between the node B and node D. The voltage at the node B will be boosted to a voltage higher than 24 V. If the boosted voltage is too high, the voltage difference between the node B and the gate of the transistor 115 may damage the gate oxide layer of the transistor 115. By adding the diode 120 between the node B and the supply voltage $V_s$, the boosted voltage at the node B can be clamped at a predetermined value or less. In some embodiments, the boosted voltage can be clamped at about 30 V or less (shown in FIG. 2).

Since the voltage of the node B is boosted and/or clamped to about 30 V or less, the transistor 115 can operate at a saturation mode. The turned-on transistor 115 can couple the node B with the node C for a charge sharing, pulling up the voltage at the node C (shown in FIG. 2). Since the voltage at the node C increases to about the turn-on voltage of the high side driver 106 or more, the high side driver 106 can be turned on, coupling the supply voltage $V_s$ with the output end A. A current can be provided from the supply voltage $V_s$ to the inductor 103 for outputting the regulated voltage $V_{out}$. By providing a current or releasing a current through the inductor 103, the switching regulator 100 can serve as a DC-to-DC converter to convert the supply voltage $V_s$, e.g., 24 V, to the regulated voltage $V_{out}$, e.g., 5 V.

It is found that the charge sharing between the nodes B and C starts if the boosted voltage at the node B is larger than the voltage at the gate of the transistor 115. The boosted voltage at the node B is capable of operating the transistor 115 at a saturation mode for the charge sharing between the nodes B and C. If the boosted voltage at the node B is removed, the transistor 115 is turned off. The turn-on or turn-off of the transistor 115 is controlled by the voltage at the node B and is free from being directly controlled by a control signal applied to the gate of the transistor 115.

Figure 3:
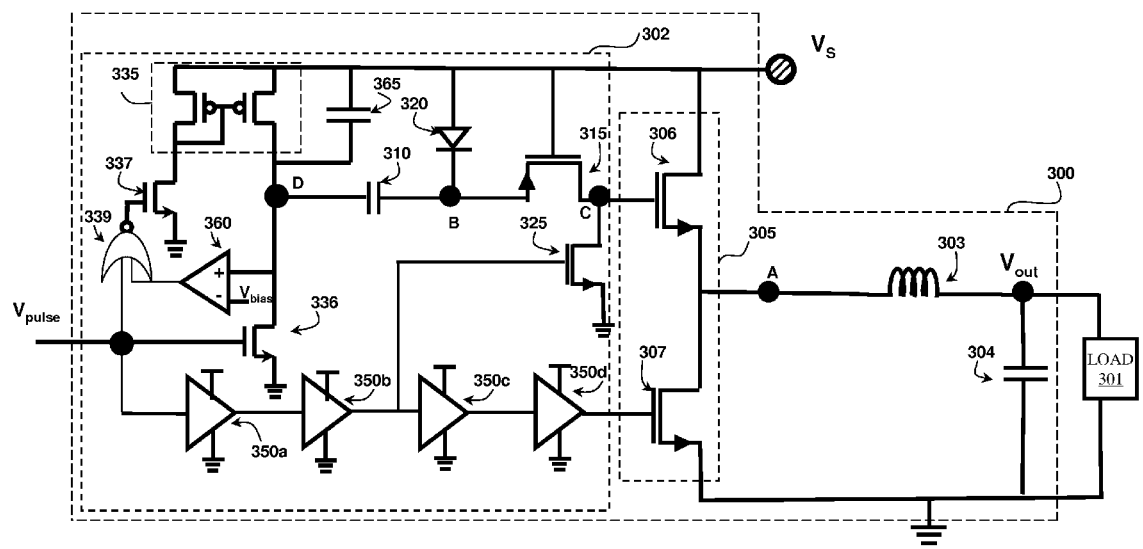
FIG. 3 is a schematic drawing illustrating another exemplary switching regulator.

FIG. 3 is a schematic drawing illustrating another exemplary switching regulator. Items of a switching regulator 300 in FIG. 3 that are the same items of the switching regulator 100 in FIG. 1 are indicated by the same reference numerals, increased by 200. In some embodiments, the regulator control circuit 302 can include an comparator 360 and a capacitor 365. The comparator 360 can be disposed between the node D and a logic gate, e.g., a NOR gate 309. The comparator 360 can have a positive end being coupled with the node D and a negative end being coupled with a bias voltage $V_{bias}$. In some embodiments, the bias voltage $V_{bias}$ can be referred to as a reference voltage. The capacitor 365 can be disposed between the node D and the supply voltage $V_s$.

The comparator 360 can be configured to sense the voltage at the node D and output a signal for floating the node D if the voltage at the node D has reached about a predetermined voltage value. For example, if the voltage at the node D is charged to or over the bias voltage $V_{bias}$, e.g., about 10 V, the comparator 360 can output a signal to the NOR gate 339 to turn off the transistor 337. Since the transistor 337 is turned off, no current is mirrored to flow through the right PMOS transistor of the current mirror 335 and the right PMOS transistor of the current mirror 335 is turned off. Since the node D is free from being directly coupled with the supply voltage $V_s$ or ground, the node D is floating. The node D can be charged to a voltage, e.g., about 10 V, substantially less than the supply voltage $V_s$ and still achieve the desired boosted voltage at the node B. By substantially reducing the voltage of the node D for boosting the node B, the power efficiency of the switching regulator 300 can be desirably improved.

The capacitor 365 can be configured to desirably reduce a noise disturbance while the node D is floating. As noted, the node D is substantially free from being directly coupled with a voltage, e.g., the supply voltage $V_s$ or ground after a voltage has been reached.

Figure 4:
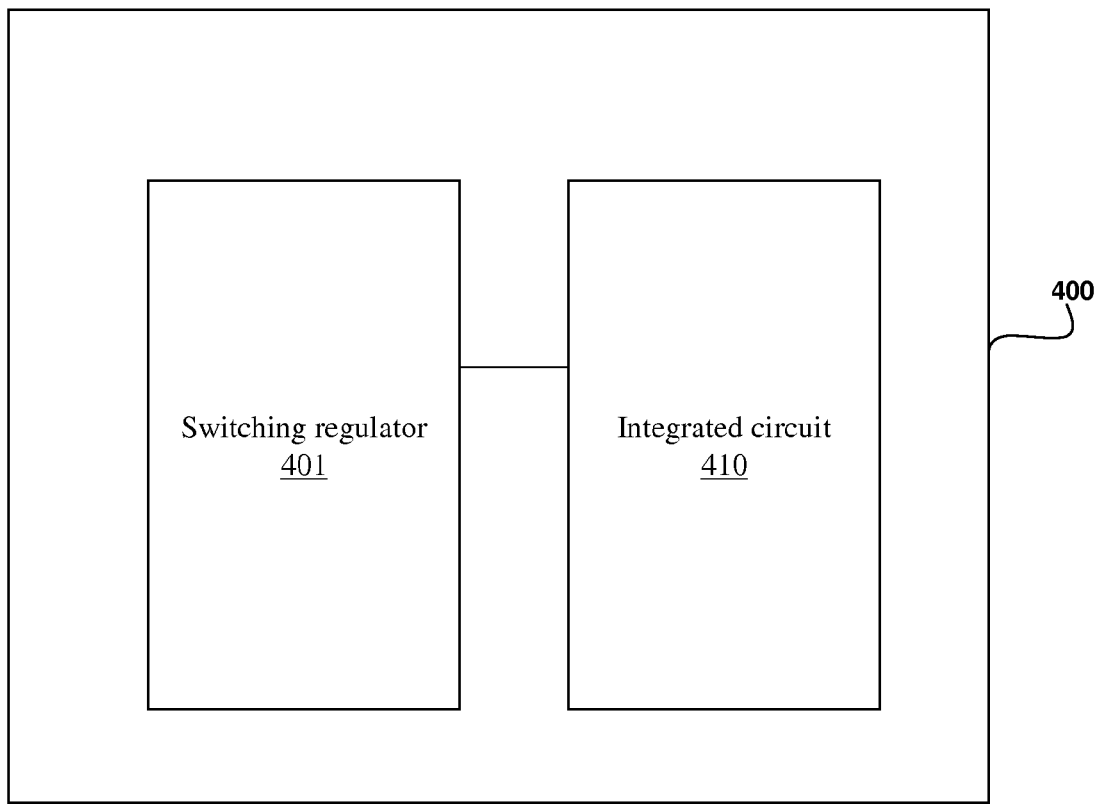
FIG. 4 is a schematic drawing showing a system including an exemplary switching regulator coupled with an integrated circuit.

FIG. 4 is a schematic drawing showing a system including an exemplary switching regulator coupled with an integrated circuit. In FIG. 4, a system 400 can include an integrated circuit 410 coupled with a switching regulator 401. The switching regulator 401 can receive an external supply voltage, converting the supply voltage to a regulated voltage to the integrated circuit 410. In some embodiments, the switching regulator 401 can be the switching regulator 100 or 300 described above in conjunction with FIGS. 1 and 3. In some embodiments, the integrated circuit 410 can be a processing unit, central processing unit, digital signal processor, memory circuits, other integrated circuit that can receive the regulated voltage for operations, and/or combinations thereof.

In some embodiments, the integrated circuit 410 and the switching regulator 401 can be formed within a system that can be physically and electrically coupled with a printed wiring board or printed circuit board (PCB) to form an electronic assembly. The electronic assembly can be part of an electronic system such as computers, wireless communication devices, computer-related peripherals, entertainment devices, or the like.

In some embodiments, the system 400 including the integrated circuit 100 can provides an entire system in one IC, so-called system on a chip (SOC) or system on integrated circuit (SOIC) devices. These SOC devices may provide, for example, all of the circuitry needed to implement a cell phone, personal data assistant (PDA), digital VCR, digital camcorder, digital camera, MP3 player, or the like in a single integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A regulator control circuit comprising:
   a high side driver being configured to receive a supply voltage;
   a capacitor configured to store charges;
   a current mirror coupled between the capacitor and the supply voltage; and
   a first transistor coupled between the capacitor at a first node and a gate of the high side driver at a second node, wherein the first node is capable of being boosted to a voltage above the supply voltage so as to operate the first transistor at a saturation mode for a charge sharing between the first node and the second node so as to substantially turn on the high side driver.

2. The regulator control circuit of claim 1, wherein the high side driver comprises a double diffused metal-oxide-semiconductor (DMOS) transistor.

3. The regulator control circuit of claim 1, wherein the capacitor and the first transistor are integrated in a single chip.

4. The regulator control circuit of claim 1 further comprising:
 a second transistor coupled between the current mirror and ground;
 a third transistor coupled between the current mirror and ground; and
 a logic gate coupled between a gate of the second transistor and a gate of the third transistor.

5. The regulator control circuit of claim 4 further comprising a comparator coupled between the capacitor and the logic gate, wherein the comparator is capable of:
 sensing a voltage at a third node that is coupled with the capacitor and opposite to the first node; and
 outputting a signal for floating the third node if the voltage on the third node is about a predetermined voltage value.

6. The regulator control circuit of claim 1, wherein the first transistor is a high-voltage PMOS (HV PMOS) transistor.

7. The regulator control circuit of claim 1 further comprising a DMOS transistor coupled between the second node and a ground.

8. A switching regulator comprising:
 an inductor;
 a first capacitor coupled with the inductor;
 a high side driver coupled with the inductor, the high side driver having a gate and being configured for receiving a supply voltage;
 a second capacitor configured to store charges;
 a current mirror coupled between the second capacitor and the supply voltage; and
 a first transistor coupled between the second capacitor at a first node and the gate of the high side driver at a second node, wherein the first node is capable of being boosted to a voltage above the supply voltage so as to operate the first transistor at a saturation mode for a charge sharing between the first node and the second node so as to substantially turn on the high side driver.

9. The switching regulator of claim 8 wherein the high side driver comprises a double diffused metal-oxide-semiconductor (DMOS) transistor.

10. The switching regulator of claim 8, wherein the second capacitor and the first transistor are integrated in a single chip.

11. The switching regulator of claim 8 further comprising:
 a second transistor coupled between the current mirror and ground;
 a third transistor coupled between the current mirror and ground; and
 a logic gate coupled between a gate of the second transistor and a gate of the third transistor.

12. The switching regulator of claim 11 further comprising a comparator coupled between the second capacitor and the logic gate, wherein the comparator is capable of:
 sensing a voltage at a third node that is coupled with the capacitor and opposite to the first node; and
 outputting a signal for floating the third node if the voltage at the third node is about a predetermined voltage value.

13. The switching regulator of claim 8, wherein the first transistor is a high-voltage PMOS (HV PMOS) transistor.

14. The switching regulator of claim 8 further comprising a low side driver, wherein the low side driver comprises a DMOS transistor.

15. The switching regulator of claim 8 further comprising a DMOS transistor coupled between the second node and a ground.

16. A method of operating a regulator control circuit, the method comprising:
 charging a capacitor coupled with a transistor at a first node; and
 boosting, by using a current minor coupled between the capacitor and a supply voltage node, the first node to a voltage above the supply voltage so as to operate the transistor at a saturation mode for a charge sharing between the first node and a second node on which the transistor is coupled with a high side driver-to substantially turn on the high side driver.

17. The method of claim 16 further comprising clamping the voltage of the first node at about a predetermined value or less.

18. The method of claim 16 further comprising:
 sensing a voltage at a third node that is coupled with the capacitor and opposite to the first node; and
 outputting a signal for floating the third node if the voltage at the third node is about a predetermined voltage value.

* * * * *